(12) United States Patent
Schöning et al.

(10) Patent No.: US 10,040,344 B2
(45) Date of Patent: Aug. 7, 2018

(54) CLOSING DEVICE FOR CLOSING AN ESSENTIAL COMPONENT OF A VEHICLE

(71) Applicant: HBPO GmbH, Lippstadt (DE)

(72) Inventors: Ralf Schöning, Herzebrock-Clarholz (DE); Matthias Grünschneder, Lippstadt (DE); Michael Breisacher, Herrenberg (DE)

(73) Assignee: HBPO GmbH, Lippstadt (DE)

( * ) Notice: Subject to any disclaimer, the term of this patent is extended or adjusted under 35 U.S.C. 154(b) by 0 days.

(21) Appl. No.: 15/183,420

(22) Filed: Jun. 15, 2016

(65) Prior Publication Data

US 2016/0368367 A1    Dec. 22, 2016

(30) Foreign Application Priority Data

Jun. 17, 2015    (DE) .................. 10 2015 109 702

(51) Int. Cl.
  *B62D 25/08*    (2006.01)
  *B60K 11/08*    (2006.01)
  *B60R 19/48*    (2006.01)

(52) U.S. Cl.
  CPC ............ *B60K 11/085* (2013.01); *B60R 19/48* (2013.01); *B62D 25/08* (2013.01); *B62D 25/085* (2013.01); *B60R 2019/486* (2013.01); *B60Y 2306/01* (2013.01)

(58) Field of Classification Search
  None
  See application file for complete search history.

(56) References Cited

U.S. PATENT DOCUMENTS

| 8,444,215 B2 * | 5/2013 | Bernt | B60K 11/085 296/193.1 |
| 8,517,130 B2 * | 8/2013 | Sakai | B60K 11/085 180/68.1 |
| 8,628,140 B2 * | 1/2014 | Malek | B29C 45/164 296/193.01 |
| 8,646,552 B2 * | 2/2014 | Evans | B60K 11/085 180/68.1 |

(Continued)

FOREIGN PATENT DOCUMENTS

| DE | 4238725 A1 * | 5/1994 | ............ B60K 11/08 |
| DE | 102009032592 A1 | 1/2011 | |

(Continued)

OTHER PUBLICATIONS

Extended European Search Report for European application No. 16174773.8 dated Oct. 24, 2016 (6 pages) and its English translation (1 page).

(Continued)

*Primary Examiner* — James A Shriver, II
*Assistant Examiner* — Hilary L Johns
(74) *Attorney, Agent, or Firm* — Rudy J. Ng; Bret E. Field; Bozicevic, Field & Francis LLP

(57) ABSTRACT

The present invention relates to a closing device (10) for closing an essential component of a vehicle particularly a radiator of a vehicle with at least one closing element (11) for regulating an air inlet to the essential component and a support element (12) for the acceptance of the at least one closing element (11) wherein the closing device (10) comprises at least one deformation element (20) for the absorption of the impact energy at the vehicle.

23 Claims, 8 Drawing Sheets

(56) References Cited

U.S. PATENT DOCUMENTS

Figure 1:
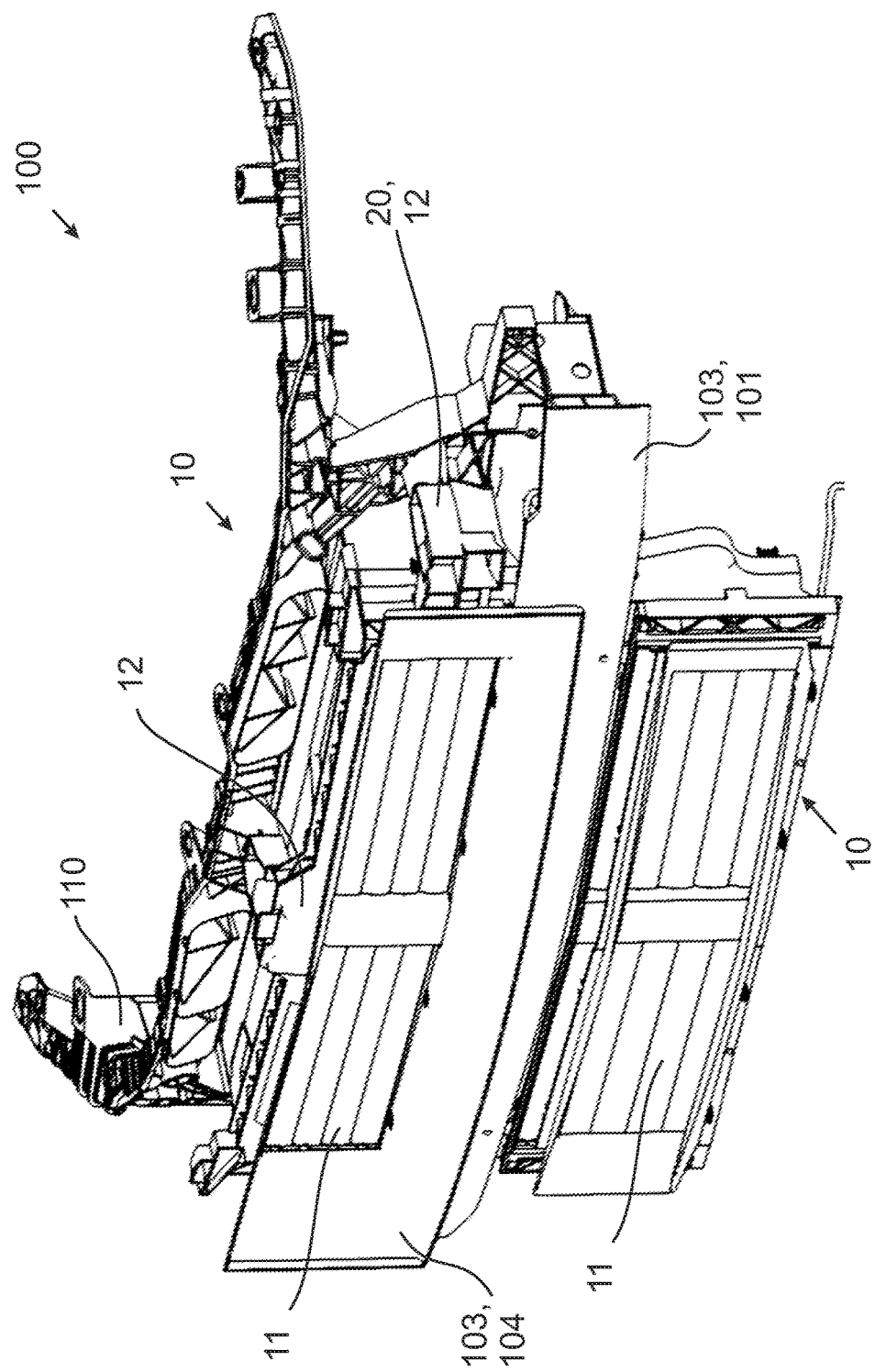

| | | | | |
|---|---|---|---|---|
| 8,887,846 B2* | 11/2014 | Yoo | ............... | B60K 11/085 |
| | | | | 180/68.1 |
| 8,967,308 B2* | 3/2015 | Saito | ............... | B60K 11/085 |
| | | | | 180/68.1 |
| 9,016,772 B2* | 4/2015 | Townson | ............... | B62D 25/085 |
| | | | | 296/193.1 |
| 9,162,641 B2* | 10/2015 | Townson | ............... | B62D 25/084 |
| 9,168,827 B2* | 10/2015 | Povinelli | ............... | B60K 11/085 |
| 9,447,719 B2* | 9/2016 | Kiener | ............... | F01P 7/02 |
| 9,533,565 B2* | 1/2017 | Elliott | ............... | B60K 11/085 |
| 9,556,783 B2* | 1/2017 | Sigurdson | ............... | B60K 11/085 |
| 2012/0019025 A1* | 1/2012 | Evans | ............... | B60K 11/085 |
| | | | | 296/193.1 |

FOREIGN PATENT DOCUMENTS

| | | |
|---|---|---|
| DE | 102011119542 A1 | 5/2013 |
| DE | 102012104723 A1 | 12/2013 |
| DE | 102013218564 A1 | 3/2014 |
| DE | 102012112824 A1 | 4/2014 |
| EP | 2301825 A2 | 3/2011 |

OTHER PUBLICATIONS

English Translation of the Search Report issued for the corresponding German application No. DE 10 2015 109 7028 dated May 10, 2016, 3 pages.

\* cited by examiner

CLOSING DEVICE FOR CLOSING AN ESSENTIAL COMPONENT OF A VEHICLE

DESCRIPTION

The invention relates to a closing device for closing an essential component of a vehicle. Further, the invention relates to a corresponding front end module of a vehicle and a method for mounting a closing device.

From the state of the art generic closing devices are known which serve for regulating an air inlet to an essential component like a radiator of a vehicle. Such closing devices are for example configured as air flap system and assembled in a front end module of the vehicle between the radiator and an air inlet. Further, the closing device comprises at least one closing element, for example an air flap, which can alter the air inlet for regulation. Due to this regulation the aerodynamic properties of the vehicle can be improved and a fast achievement of the operating temperature of the engine can be achieved. The closing device is normally assembled in a front end module of the vehicle. Apart from the closing device the front end module often receives further functional components of the vehicle like, for example a bumper, one or multiple headlights and different sensors and the like.

Known closing devices, however, comprise the disadvantage that they are limited in their function to the regulation of the air inlet. Conventional front end modules comprise the disadvantage that they are constructed complexly and extensively and multiple fastening means are needed for the functional components to be received as well as plenty of construction space. The mounting of the closing device and of the front end module to the vehicle are often complicated and complex. Further, for the assembly of the closing device together with the fastening means of the front end module plenty of construction space and great material usage are needed, such that particularly the weight of the vehicle and the cost for the production and mounting are increased. An additional mounting and cost effort results by the assembly of deformation elements for the absorption of the impact energy during rear-end collisions or suchlike which require further construction space.

Therefore, it is the object of the present invention to at least partly avoid said disadvantages, Particularly, it is the object of the invention to provide a closing device for closing an essential component of a vehicle, particularly, a radiator of the vehicle, which comprises an improved and extended functionality and reduces the necessary construction space and the costs during montage.

The previous object is solved by a closing device with the features of claim 1, a front end module with the features of claim 17 and by a method with the features of claim 20. Further features and details of the invention result from the respective dependent claims, the description and the drawings. Thereby, features and details which are described in connection with the closing device according to the invention naturally also apply in connection with the front end module according to the invention and the method according to the invention and vice versa, such that according to the disclosure of the single aspects of the invention it can always be reciprocally related to.

The object is particularly solved by a closing device for closing an essential component of the vehicle, particularly a radiator of the vehicle, with at least one closing element for regulation of the air inlet to the essential component and the support element for receiving the at least one closure element. Hereby, it is intended that the closing device comprises at least a deformation element for the absorption of the impact energy at the vehicle, particularly the front side of the vehicle. By impact energy hereby particularly each effect resulting in a damage of the vehicle is described which occurs during a force effect on the front area of the vehicle by, for example, a rear-end collision or a front end collision of the vehicle with an obstacle or suchlike. The idea of the invention is particularly that the closing device is configured in a way that the closing device comprises further functions apart from the closing of the essential component, particularly from the regulation of the air inlet to the essential component. Particularly for performing its primary function, this means the regulation of the air inlet, the closing device can comprise the at least one closing element which is, for example, configured in form of a lamella and/or a roller blind and/or suchlike. In case the closing element is, for example, configured as a lamella, it is adjusted by a movement, like for example a turning about the longitudinal axis, in a way that the air inlet opening is at least partially closed by its plane extension, and vice versa in the open position the air inlet opening is at least partially released. The primary function of the closing device enables thereby, for example, an improvement of the aerodynamic properties of the vehicle, The vehicle can, for example, be a motor vehicle and/or an automobile and/or commercial vehicle and/or suchlike.

As a further function, meaning secondary function, the closing device can comprise at least one deformation element for absorption of the impact energy at the vehicle. These deformation elements are particularly crash boxes integrally shaped at the support element which particularly comprise a deformation profile. The at least one deformation element is for example a casting component configured in one part and/or forms a common monolithic component and therewith in one part particularly a casting (injection moulding) component with the support element. The at least one deformation element is thereby particularly configured in a way that it can receive deformation energy during an impact and therewith is configured as an energy absorber for example as a pedestrian protection. Therefore, the deformation element can preferably comprise a hollow chamber profile which is preferably enclosed by a lateral (preferably gas-tight) wall. The wall of the deformation element can preferably be configured funnel-like and/or can comprise waviness. Thereby, the deformation element is assembled particularly preferred at the vehicle in a way that it absorbs the impact energy primarily, meaning mainly before the essential component, during an impact (mainly frontal impact). The deformation element thereby particularly comprises a deformable fastening geometry such that it is constructed for a deformation during an impact. The hollow space of the deformation element is preferably opened in a direction transverse to the vehicle (transverse axis of the vehicle), particularly completely enclosed from the wall of the deformation element and/or in the direction of the vehicle upper and/or lower side (vertical axis of the vehicle). The deformation element is preferably adjusted in the longitudinal direction in a way that it comprises for example the greatest extension (length) in the longitudinal direction of the vehicle and/or, if deformed or compressed during the impact, can hereby absorb the bigger part of the impact energy. Hereby, particularly the advantage is achieved that by the deformation element a bumper cross member which is moved in the direction of the motor compartment by the impact can be absorbed without damaging the essential component and/or further functional components of the vehicle.

Preferably, the deformation element is configured or designed to deform plastically (permanently), in particular, the deformation element is configured to exclusively and/or predominantly deform plastically. Predominantly refers to the fact that an amount of an elastic deformation is much lower than an amount of a plastic deformation of the deformation element when absorbing the impact energy at the vehicle. Is is particularly possible that the at least one deformation element for absorbing the impact energy at the vehicle is configured to deform in the action of absorbing, for example, when an impact occurs, and particularly deforms plastically (which particularly means permanently and/or not elastically). In order to allow for a plastic deformation of the deformation element when a force acts on the deformation element, it may be provided that the deformation element is configured rigid and/or with a high stiffness and/or inelastic and/or without spring. Preferably, when absorbing the impact energy, an irreversible damage of the deformation element occurs. Preferably, this damage and/or the deformation of the deformation element is caused by a force, which acts from the front side of the vehicle. In other words, the deformation of the deformation element is preferably effected by a force from a front side of the deformation element, wherein this front side is opposite to another side facing the radiator and/or the front side is facing away from the radiator. Particularly, the deformation element is intended exclusively for absorption and is therefore, preferably, not intended for another function, such as a supporting or a reinforcement of the support element and/or the closing device.

Preferably, the deformation element is arranged at or in the vehicle and/or at or in the closing device unmovably. Preferably, the deformation element is configured free of movable parts. Particularly, the deformation element is configured as one piece and/or monolithic.

Particularly, the deformation element is configured separately from a bumper and/or a bumper cross member.

Preferably, the deformation of the deformation element for absorption occurs in such a way that the deformation element remains as one piece and/or free of cracks, and therefore, for example, a breaking of the deformation element is avoided. This allows to avoid a damaging by detached parts. In particular, the deformation element is free of a predetermined breaking point.

Preferably, the impact energy depends on or results from an influence (or action) on the front side of the vehicle, particularly from the outside of the vehicle, especially an impact.

Preferably, within the scope of the invention it can be intended that the support element is configured for the assembly of a cover element at least partially assembled outside the vehicle (e.g. outside and interior of the vehicle), wherein particularly the cover element is a bumper coating. Hereby, a further function results, particularly, a secondary function apart from the already described primary function (closing of the essential component) and the secondary function (usage of the deformation element). According this further function the closing device can serve as a mounting bench for the cover element in order to mount the cover element at the front end module of the vehicle. The cover element can thereby comprise a transition to the engine hood which should be preferably configured without interruption due to optic and aerodynamic reasons.

Further, the closing device can preferably comprise a justifying means in order to justify the position of the cover element at least in one direction. Thereby, the position of the cover element can be adjusted in the vehicle vertical axis or vehicle vertical direction by the justifying means in order to receive an exact and narrow groove between the bumper cover and the engine hood. The closing device according to the invention can thereby comprise a compensatory tolerance functionality in order to configure the transition between the front end module, particularly the bumper cover and the engine hood, optimally and preferably fluently and consistently using simple means. The bumper cover is particularly a visible component of the vehicle front and plays an important role in modern vehicles. Thereby, it serves as a design element and further comprises multiple technical properties, for example as an element which is exposed to an air resistance during driving, and thereby accordingly influences the aerodynamics of the vehicle. Preferably, thereby the closing device according to the invention can serve as a mounting bench for the bumper cover and enables an optimal positioning of the bumper cover relating to the engine hood. For the optimal positioning, for example in height, serves the justifying means of the closing device.

Preferably, within the scope of the invention it can be intended that the support element is configured for arranging at least one functional component of the vehicle. The arrangement of the functional component of the vehicle thereby corresponds to a further function (or a secondary function), wherein the functional components for example comprise attachment components and/or retainers, like a raw air duct (fresh air duct) for the raw air (fresh air) exhaustion and/or mountings or supports for the distance regulation sensor of the vehicle. Further, the at least one deformation element and/or further separate deformation elements can possibly be regarded as functional components. Particularly, apart from the actual mounting support of the front end module therewith also the closing device can serve for mounting of functional components of the vehicle. This increases the scope of design of the front end module and further assists to optimally utilize the construction space and to facilitate the mounting of the front end module.

It is further possible, that the functional component comprises at least one of the following components: a sensor, a sensor system (e.g. with multiple sensors), a camera, an air duct (air flow), a headlight, a bumper and/or suchlike. Herefore, the support element, for example, comprises fastening means for the functional components, for example, to connect the air flow and/or the sensor to the support element. Further, it can be intended that at least some of the functional components build a monolithic component with the support element and/or are integrally shaped with the support element. The functional component can further, for example, be connected to the support element in a removable or permanent way. At a front side of the closing device, meaning in the direction of the vehicle front, a front air duct (flow) can be inserted as a functional component which channelizes the airflow from the inlet opening, meaning for example the radiator, to the closing device. On the rear side of the closing device a further (rear) air duct (air flow) can be assembled, for example, as a functional component which channelizes the airflow to the essential component, particularly a radiator net area of the radiator. At the lower side of the closing device, for example, a pre-positioning for the bumper bracket system can he intended. Due to this multi-functional configuration of the closing device construction space can be saved and the cost for the mounting can be reduced.

Optionally, it can be intended that the deformation element serves as an energy absorber for the pedestrian protection during an impact of the vehicle. Alternatively or additionally, the deformation element serves particularly as a protection of the essential component of the vehicle, particularly the radiator, wherein during an impact it initially absorbs the impact energy before a damage of the essential component can occur. Thereby, it is particularly intended that the deformation element comprises exclusively a primary function as an energy absorber and/or additionally only as a secondary function, for example, as a fastening means and/or fixation aid. Therewith, other elements, walls and resting means of the closing device can not be considered as deformation elements since these do not serve primarily for the energy absorption and/or for the pedestrian protection and/or for the acceptance of impact energy and comprise no primarily adjusted configuration. By the deformation element the functionality of the closing device is further improved.

According to a further advantage it can be intended that at least two deformation elements, meaning particularly a first right sided and a second left sided deformation element, are configured at the support element, wherein particularly the deformation elements are assembled on the opposing sides of the support element. Thereby, the closing device is particularly assembled at the vehicle and/or at the front end module in a way that the deformation elements are assembled at the opposing sides of the vehicle transverse direction. Hereby, an optimal protective effect by the deformation elements results.

It is further possible that a third deformation element, particularly in transverse direction of the vehicle, is intended centrically at the support element. The third deformation element is therewith assembled centrically, particularly in vehicle transverse direction, meaning preferably opposing to the central area of the radiator and a radiator grill of the vehicle. The assembly of the third deformation element occurs particularly in a way that the third deformation element comprises mainly the same distance to the first and to the second deformation element and preferably between the first and second deformation element, particularly preferably however on different heights (for example above). Hereby, the protection by the deformation elements is further increased.

According to a further advantage it can be intended that the deformation element comprises at least one hollow chamber, particularly, more than two or three hollow chambers. The hollow chambers can be configured by walls of the deformation element as elements of the hollow chamber profile of the deformation element. The at least one hollow chamber is for example adjusted and/or configured in a way that it comprises the greatest extension mainly in longitudinal direction of the vehicle. Therewith, an improved protection of the essential component can be affected.

Advantageously, the support element can be configured for fixing an actuator in order to drive the at least one closing element. Therewith, the closing device can configure an assembly which can autonomously be taken into operation meaning, for example, independently from external devices like external operators. Further, the closing device can comprise at least one corresponding control in or at the carrier element for the operation of the closing element. The closing elements or the closing element is herefore controlled and/or moved in a way that the closed position of the closing element reduces the cross section (current cross section) of the air inlet opening to the essential component and hereby the air inlet is at least partially prevented, and in the open position the air inlet is at least partially released to the essential component and the cross section is therewith increased. The air inlet opening is for example the area of the closing device between the closing elements configured as lamella, through which the airflow occurs or the radiator grill opening or suchlike.

It is further possible that the closing element is a roller blind element. By the closing device according to the invention the air inlet can be configured variably to the essential component, for example to the radiator of the vehicle. Thereby, the closing element in form of a roller belt element can be advantageous in order to achieve a construction space saving, particularly in longitudinal direction of the vehicle. The closing element thereby possesses particularly the advantage that it is coilable and/or decoilable and preferably configured particularly narrow and therewith only requires little construction space.

It is further possible that the closing element is an air flap. The air flap can thereby be adjusted in the vehicle vertical axis and also in the vehicle transverse axis. The closing element in form of air flaps can be advantageous in order to particularly quickly regulate the air inlet to the essential component of the vehicle. This is for example affected by a turnable mounting about the longitudinal axis of the air flap. Hereby, for example bearing elements like bearing cones are intended at the closing element, for example, opposing the longitudinal direction.

A further advantage can he achieved within the scope of the invention in case a plurality of closing elements is intended in order to adjust the desired revetment of the essential component. In case the closing element is a roller blind element, multiple roller blind elements can configure a roller blind which can be coiled to a rod in a simple manner and vice versa in order to enable or permit the air inlet to the radiator. Thereby, the roller blind can, for example, only partially release the air inlet, in that it is only drawn up, until a certain amount of fresh air is guided to the radiator. Hereby, an optimal regulation of the air inlet can occur. Multiple closing elements, particularly, ventilation flaps thereby facilitate the regulation and the determination of the amount of air which can enter.

Advantageously it can be intended that the closing device is configured as a front module adaptor. The front module adaptor thereby comprises particularly as a mayor task the assembly and the carriage of the bumper cover. For example, a main carrier of the bumper is assembled at the front module adaptor. Further, the sword of the radiator cover, particularly the radiator grill can be supported in longitudinal direction of the vehicle, particularly as partial area of the bumper in the front module adaptor. Further, the front module adaptor is preferably assembled at the mounting carrier in order to enable a secure assembly in the front end module.

A further advantage within the scope of the invention can be achieved when the support element and the deformation element configure a common monolithic component, meaning particularly one piece/one part, and that particularly the support element and the deformation element are configured from the same material preferably as a casting (particularly injection moulding) component. The carrier element and also the deformation element thereby can be configured from plastic, particularly a heat resistant and/or gas proof plastic. Hereby, the production and mounting of the closing device and the deformation element are further simplified and/or cost are reduced. Thereby, at least two or at least three or at least four deformations elements can be configured by the support element.

A further advantage within the scope of the invention can be achieved when the support element, particularly the deformation element comprises a fixation aid in order to fix the closing device at the vehicle. The deformation element and/or the fixation aid thereby preferably serve for the mounting of the support element or the closing device at the mounting support, particularly a front end module. The fixation aid can thereby be configured as a geometric adjustment of a wall of the deformation element and/or as a recess and/or opening and/or guidance of the deformation element. Hereby, a simple and fast mounting of the closing device is enabled.

Further, it can be intended within the scope of the invention that the fixation aid is configured in form of a guidance which particularly interacts with a fixation means, wherein preferably the fixation means is configured in form of a screw. Further, at least two fixation aids can be intended wherein, for example, a first fixation aid is intended at the front side and a second fixation aid at the rear side (in direction of the vehicle rear side or vehicle rear end) of the deformation element. The fixation aid can thereby be configured differently and/or can comprise different functions. Thus, for example, the first fixation aid can be configured as a guidance (for mounting) and the second fixation aid can be configured as an acceptance for the fixation means, particularly a screw (for mounting). The fixation means thereby particularly serves for the direct assembly at the mounting support of the vehicle. The guidance thereby simplifies preferably the mounting of the closing device at the mounting support.

Likewise a subject matter of the invention is a front end module of a vehicle with a mounting support. Hereby, it is intended that the front end module comprises at least one, particularly at least two, closing devices with at least one deformation element for the absorption of the impact energy at the vehicle. Thereby, the front end module according to the invention provides the same advantages like they are described in detail in relation to the closing device according to the invention. Further, the front end module according to the invention can comprise a closing device according to the invention. The deformation elements can thereby particularly serve for the assembly of the closing device and the mounting support, wherein these only represent the secondary function of the deformation element. The primary function of the deformation elements is the absorption of the impact energy with for example an accident with the vehicle. Since the closing device is preferably assembled in the front area of the vehicle, hereby particularly energy influences by an impact in the front area of the vehicle have to be understood. The mounting support thereby serves particularly for an assembly of a plurality of functional components and/or essential components of the vehicle. The closing device is thereby assembled particularly between a radiator grill and a radiator of the vehicle. Alternatively or additionally, it is possible that at least two closing devices are assembled above one another for example in direction of the vertical axis of the vehicle or the vertical direction of the vehicle.

It is further advantageous within the scope of the invention when the closing element is assembled at the mounting support by the fixation aid and/or by at least one deformation element, meaning particularly via a wall or in the area of the deformation element at the mounting support. Thereby, the fixation aid is for example configured as an acceptance and/or juncture for a fixation means. The fixation means can thereby, for example, be a screw and/or a glue and/or a resting means. Hereby, a simple and fast mounting of the front end module is enabled.

Further, a subject matter of the invention is a method for mounting a closing device which is configured for closing an essential component of the vehicle, particularly a radiator, and with at least one closing element for regulating the air inlet to the essential component and a support element for the acceptance of the at least one closing element. Hereby, it is intended that the closing device comprises at least one deformation element for absorption of the impact energy at the vehicle. The method comprises particularly the following steps which are preferably performed one after the other;
1) Assembly of the closing device of the vehicle and
2) Arresting of the closing device at the vehicle by a fixation aid, meaning particularly by using the fixation means of the closing device.

Therewith, the method according to the invention provides the same advantages like they are described in detail for the closing device according to the invention and/or described for the front end module according to the invention. Further, the method according to the invention can serve for mounting a closing device according to the invention and/or front end module according to the invention.

Figure 3:
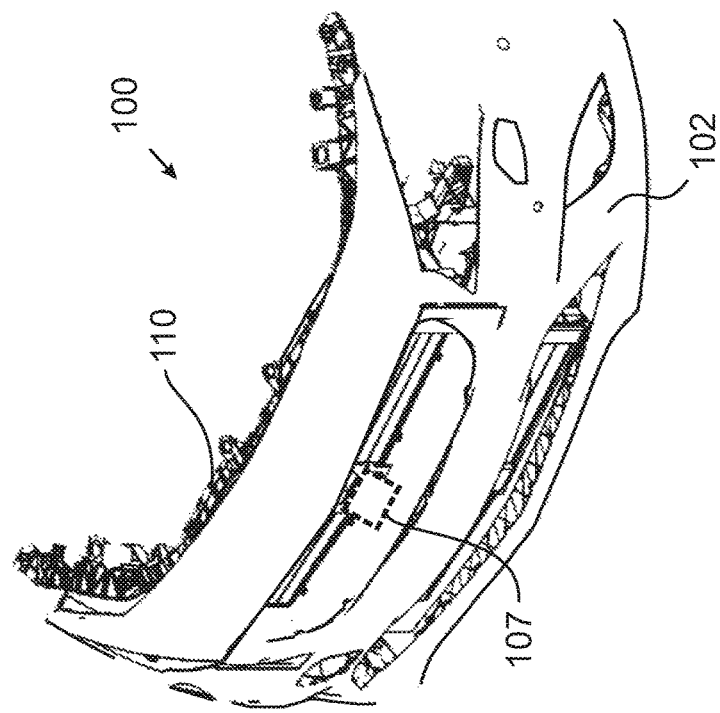
Figure 2:
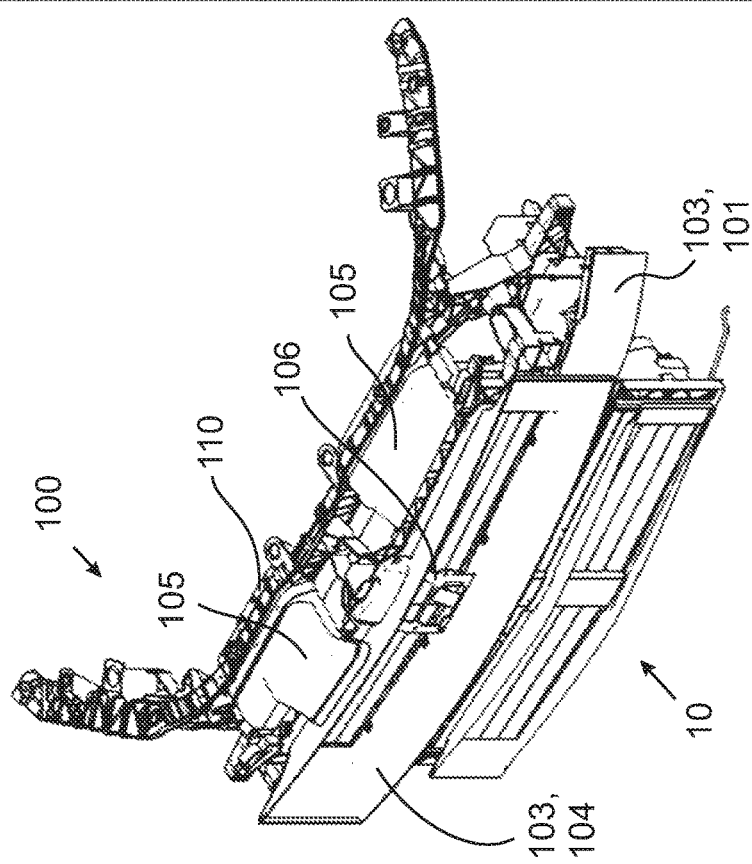
Figure 4:
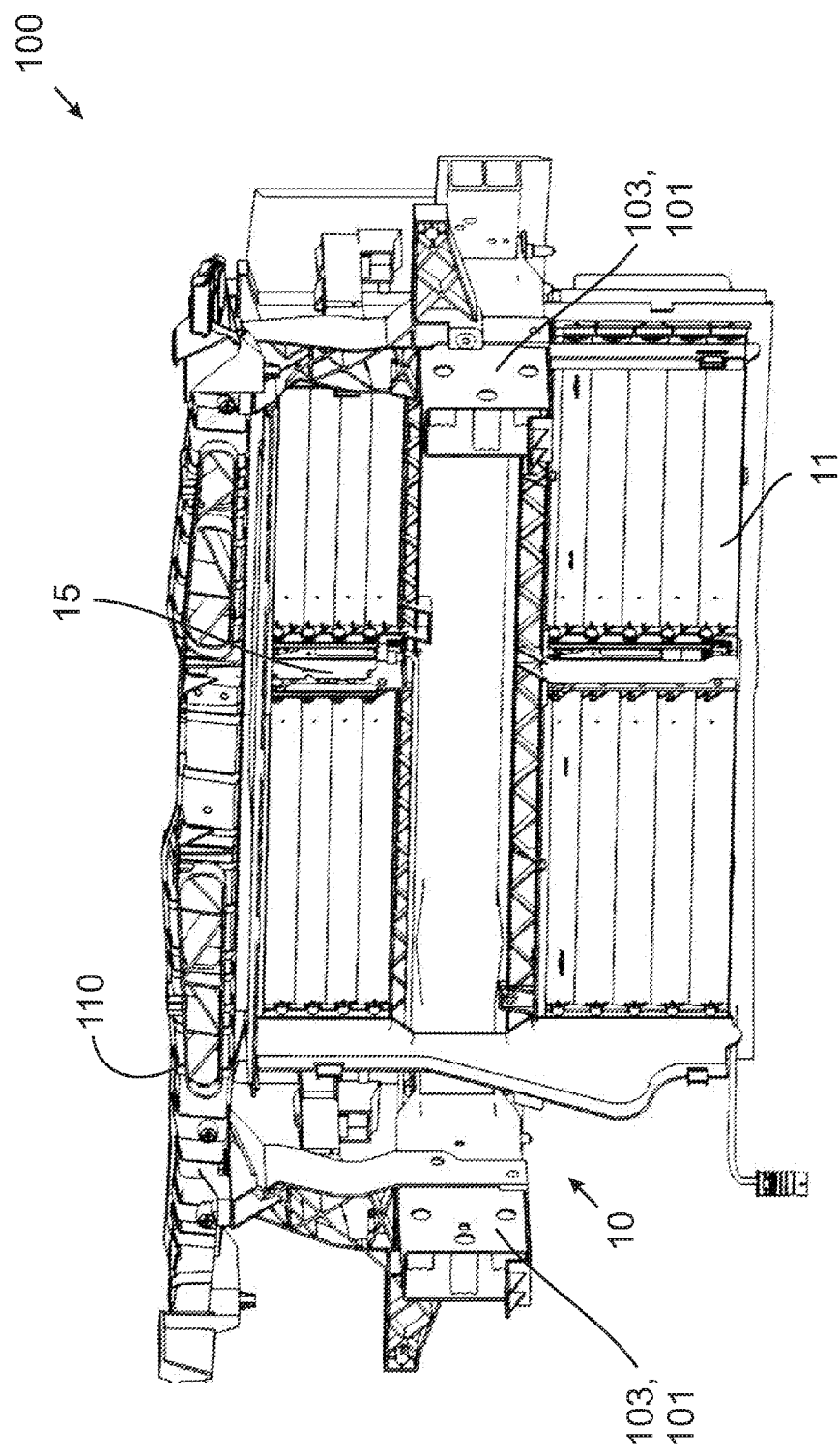
Figure 5:
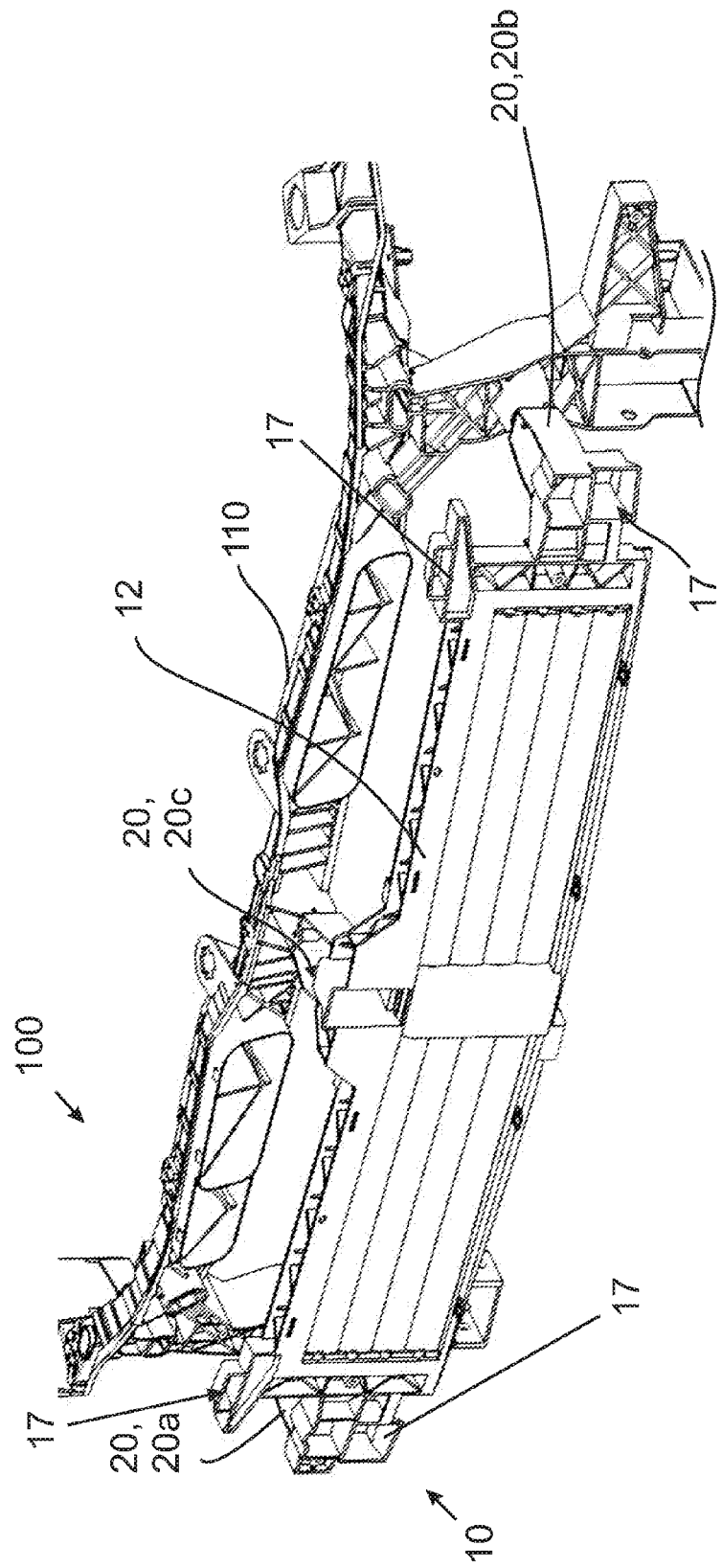
Figure 6:
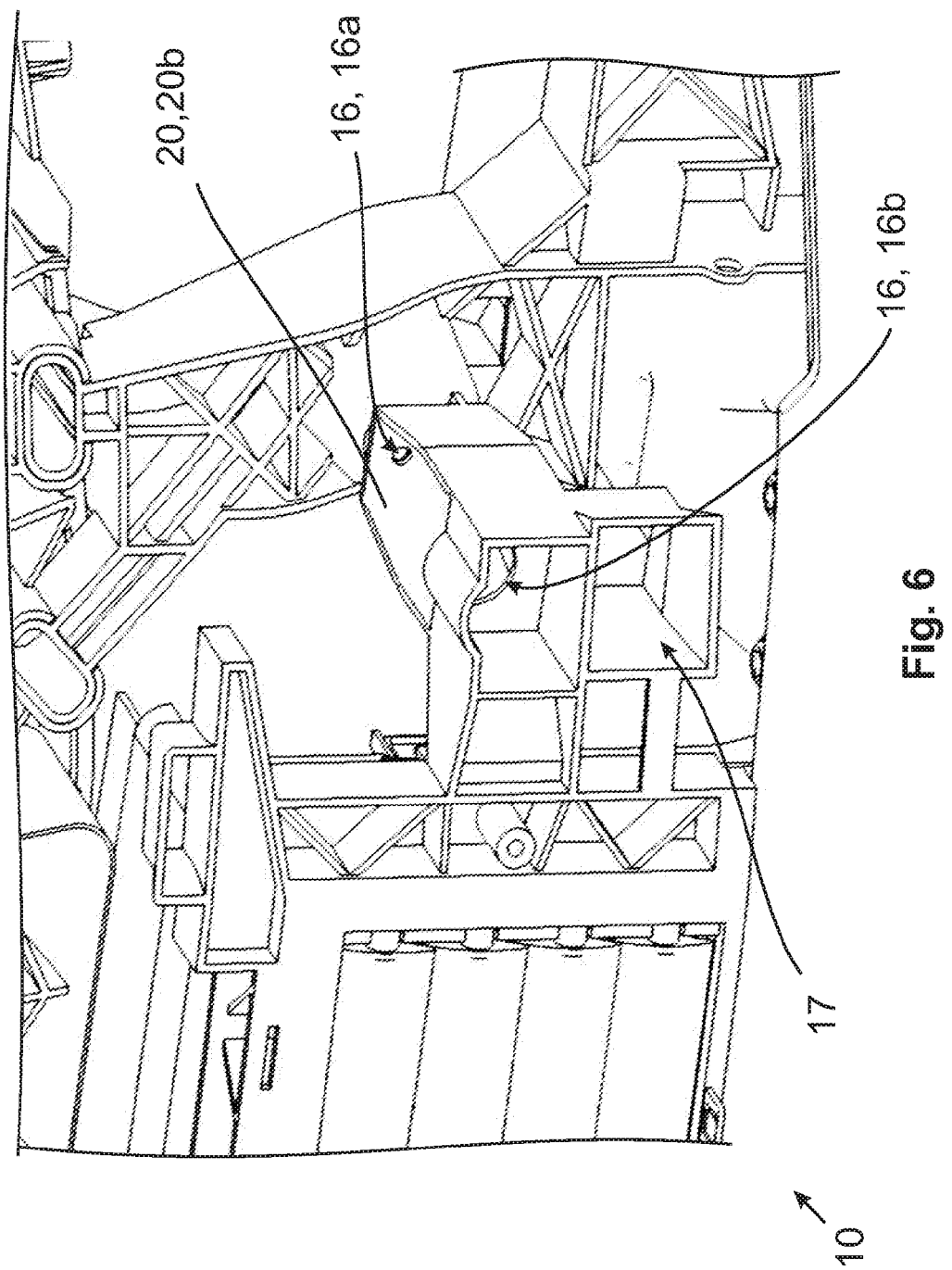
Figure 8:
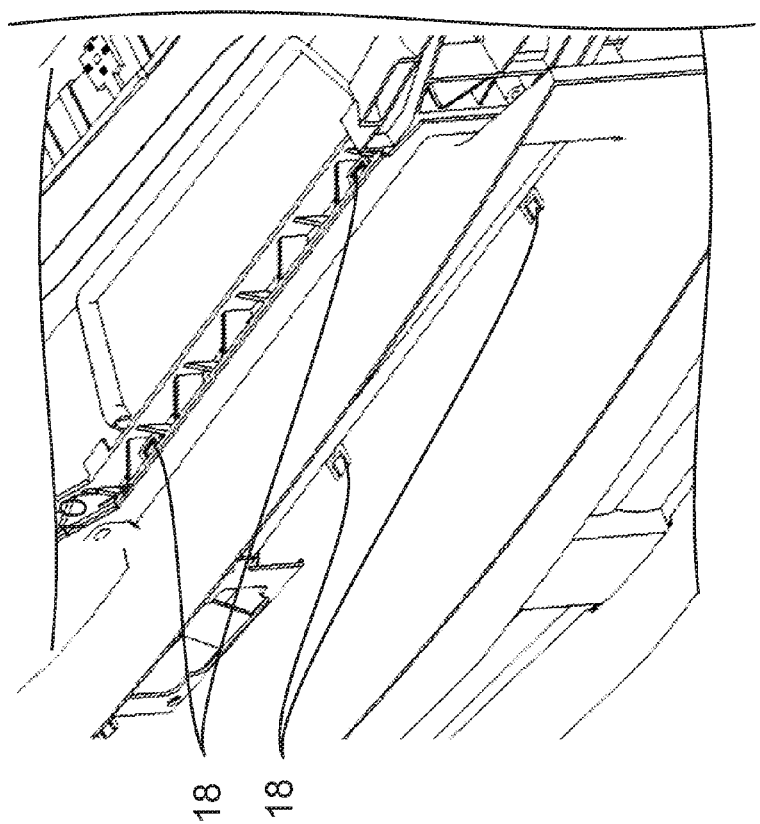
Figure 7:
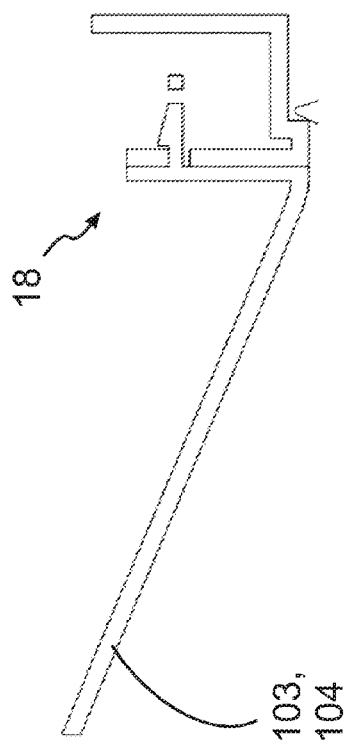
Figure 10:
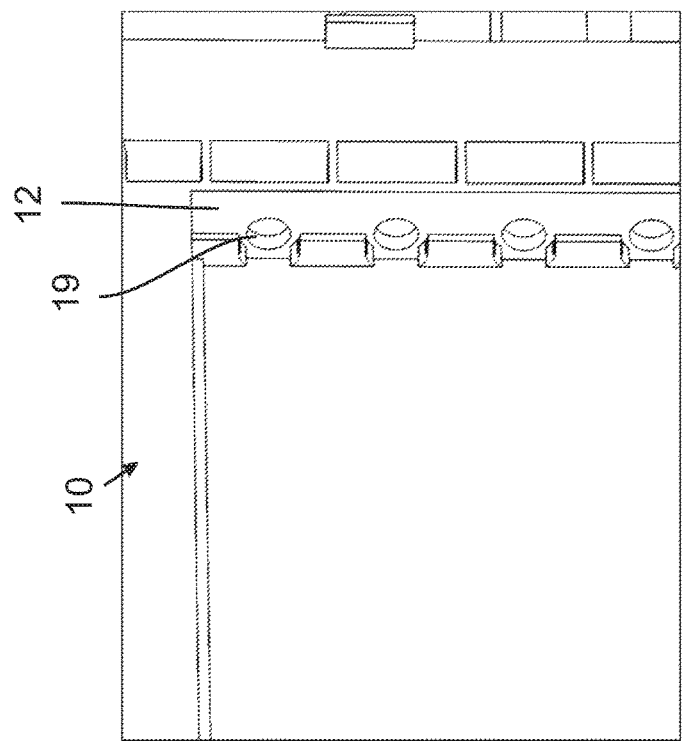
Figure 9:
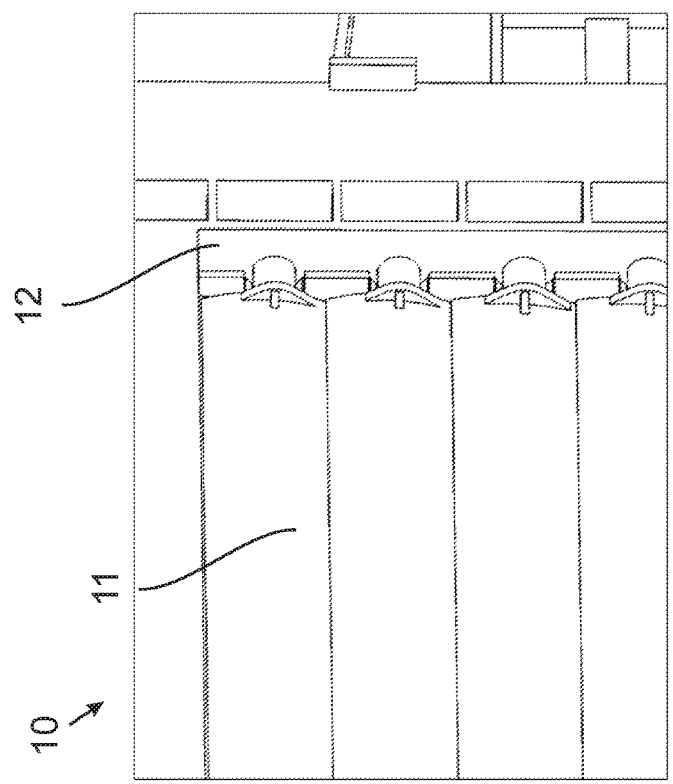
Figure 11:
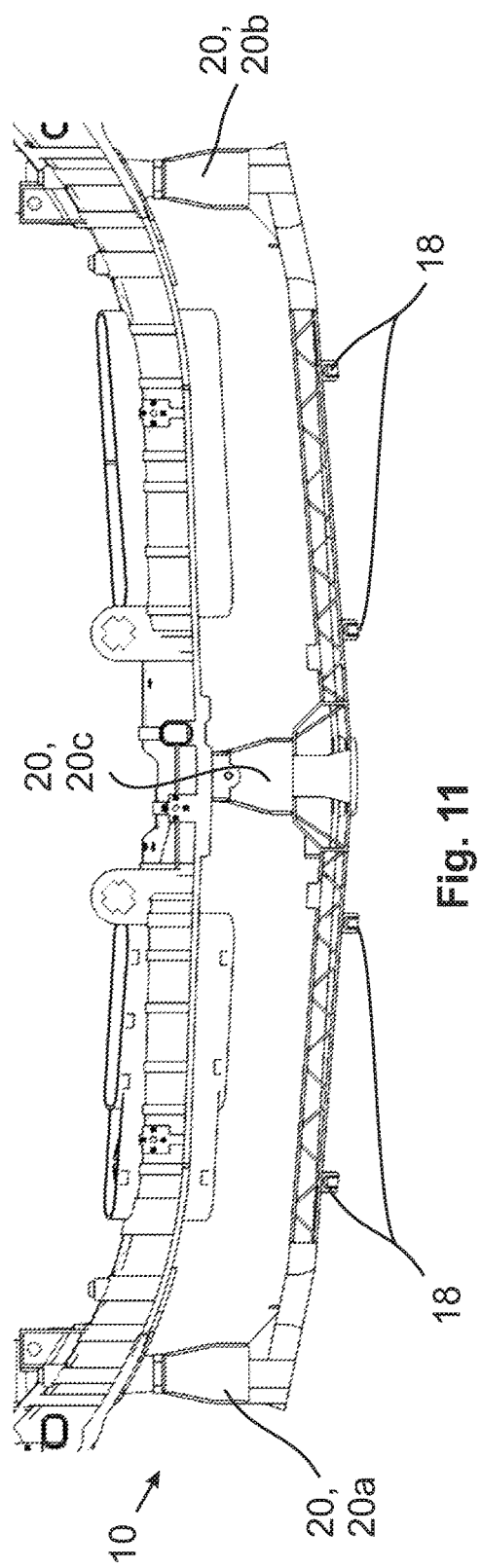
Figure 12:
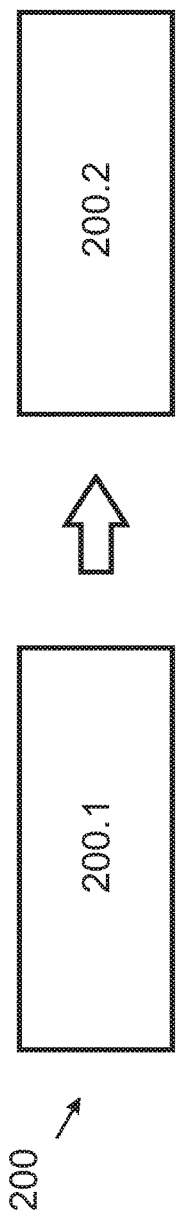

Further advantages, features and details of the invention result from the subsequent description in which embodiments of the invention are described in detail in relation to the drawings. Thereby, the features described in claims and description can be essential for the invention each single for themselves or in any combination. It is shown:

FIG. 1 a schematic view of parts of the front end module according to the invention, FIG. 2 a further schematic view of parts of the front end module according to the invention, FIG. 3 a further schematic view of parts of the front end module according to the invention with a bumper cover, FIG. 4 a schematic rear view on parts of the front end module according to the invention, FIG. 5 a schematic perspective view on parts of the front end module according to the invention, FIG. 6 a schematic enlarged representation of the deformation element, FIG. 7 a schematic representation of a fastening means, FIG. 8 a schematic enlarged representation of the fastening means, FIG. 9 an enlarged schematic representation of parts of the closing device according to the invention, FIG. 10 an enlarged schematic representation of pats of a closing device according to the invention, FIG. 11 a schematic top view on parts of the closing device according to the invention, FIG. 12 a schematic representation for visualisation of the method according to the invention.

In the subsequent figures for the same technical features identical reference signs are used also for different embodiments.

FIG. 1 schematically shows a perspective view of parts of the closing device 10 according to the invention and parts of the front end module 100 according to the invention. Thereby, a mounting support 110 is recognizable which is adjustable in the front area of the vehicle. The closing device 10 according to the invention comprises at least one closing element 11 and a support element 12. In FIG. 1 it can be recognized that the front end module 100 according to the invention comprises two closing devices 10 according to the invention which are assembled one below the other. Further, it can be recognized that a closed position of the closing device 100 is shown, wherein the closing elements 11 prevent an air inlet opening for an air stream to the essential component, particularly a radiator. The not shown essential component, particularly the radiator, is thereby assembled behind the closing device 10. In an open position the closing elements 11 configured as lamella can be moved or turned in a way that the air inlet opening is released and therewith the air inlet is enabled, particularly through the shown air flow 104. The shown air flow 104 thereby serves as functional component 103 which is connected with the closing device 10. The direct assembly of the functional component 103 at the closing device 10 thereby corresponds to another function of the closing device 10. According to the invention as a further function a deformation element 20 is intended at the support element 12 which is particularly configured by the support element 12. Optionally, a bumper 101 can be assembled at the support element 12 as a function component 103.

The FIGS. 2 and 3 show respectively a perspective view of parts of a front end module 100 according to the invention with a closing device 10 according to the invention. Thereby, in FIG. 3 additionally a bumper cover 102 is shown which is assembled at the support element 12 as a cover element 102 of the closing device 2 according to the invention. Further, a further functional component 103 connected to the support element 12 is intended which is configured as a sensor assembly 107. The sensor assembly 107 thereby serves as a distance regulating sensor. In FIG. 2 further a fresh air duct 105 assembled behind the bumper cover 102 can be recognized which can be likewise assembled at the support element 12. The sensor assembly 107 can for example be assembled at the sensor holder 106, wherein the sensor holder 106 is connected to the support element 12.

FIG. 4 shows a rear view on parts of the closing device 10 according to the invention and to functional components 103 connected to a support element 12. Thereby, it can be recognized that the closing device 10 according to the invention and particularly the support element 12 are configured for the acceptance of an actuator 15 for operating, meaning particularly for the gear and/or movement of the closing elements 11.

In FIG. 5 a perspective front view on parts of the front end module 100 according to the invention and a closing device 10 according to the invention are shown. Thereby, in the lateral area of the support element 12 of the closing device 10 at least one acceptance 17, particularly multiple acceptances 17, are intended which for example serve for the acceptance of a base support of the bumper 101. The acceptances 17 can thereby configure a monolithic component with the support element 12 and therewith can be configured from the same material as the support element 12. Moreover, further acceptances 17 are intended for the acceptance of the radiator cover and/or bumper bracket. The acceptances can thereby, for example, comprise a hollow space which can be particularly configured funnel-like. Besides, the support element 12 comprises at least three deformation elements 20. A first deformation element 20a and a second deformation element 20b are thereby assembled on opposing sides of the carrier element 12 in transverse direction of the vehicle. A third deformation element 20c is assembled centrically at the support element 12 and higher than the first and second deformation element 20a, 20b. Like it can he recognized in FIG. 6 the deformation element 20 (possible each of the) deformation elements 20 comprise a fixation aid 16 wherein a first fixation aid 16a can be for example configured as an acceptance for a screw and a second fixation means 16b can for example be configured as a guidance for mounting. The deformation elements 20 thereby enable as a secondary function the assembly of the closing device 10 directly at a mounting support 110.

In FIGS. 7 and 8 a possible configuration of the fastening means 18 particularly as clips or latching means is shown. The fastening means 18 can thereby be intended as a support element 12 like shown in FIG. 8 and enable a fastening of a functional component 103, particularly, an air duct 104 like shown in FIG. 7.

In FIGS. 9 and 10 the assembly and bearing of the closing elements 11 of the closing device 10 according to the invention is shown. Thereby, the support element 12 which can be configured as a frame, comprises one or multiple bearing elements 19 respectively for each closing element 11. The bearing elements 19 can for example be configured as acceptances for bearing cones of the closing element 11.

FIG. 11 shows a top view of parts of the closing device 10 according to the invention, wherein hereby clearly the assembly of the deformation element 20 at the support element 12 can be recognized. Further, it can be recognized that the support element 12 comprises at least three fastening means 18 for fastening a functional component 103, particularly an airflow 104.

In FIG. 12 a method 200 according to the invention is schematically visualized. Thereby, a closing device 10 according to the invention is assembled at the vehicle according to a first method step 200.1 and according to a second method step 200.2. The closing device 10 according to the invention is assembled at the vehicle wherein hereby particularly a fixation means is used at a fixation aid 16 of the closing device 10. Thereby, a fixation aid 16 configured as a guidance can be used in order to screw a screw for assembly of the closing device 10 at a mounting support 110.

The previous description of the embodiments describes the present invention only within the scope of examples. Naturally, single features of the embodiments as far as technically meaningful can be freely combined with one another without leaving the scope of the present invention.

REFERENCE LIST

10 Closing device
11 Closing element
12 Support element
15 Actuator
16 Fixation aid/guidance
16a First fixation aid
16b Second fixation aid
17 Acceptance, bumper brace
18 Fastening means, clips
19 Bearing elements
20 Deformation element
20a First deformation element
20b Second deformation element
20c Third deformation element
100 Front end module
101 Bumper
102 Cover element, bumper coating
103 Functional component
104 Air duct
105 Fresh air duct
106 Sensor holder
107 Sensor assembly
110 Mounting support
200 Method
200.1 First method step
200.2 Second method step

The invention claimed is:

1. A closing device for closing an essential component of a vehicle with at least one closing element for regulating an air inlet to the essential component and
a support element for the acceptance of the at least one closing element, wherein
the closing device comprises at least one deformation element for the absorption of the impact energy at the vehicle,
wherein the deformation element comprises a fixation aid and is adapted to mount the closing device on a mounting support of the vehicle through the fixation aid of the deformation element.

2. The closing device according to claim 1, wherein, the support element is configured for the assembly of a cover element, at least partially assembled outside of the vehicle.

3. The closing device according to claim 1, wherein, the support element is configured for the assembly of at least one functional component of the vehicle.

4. The closing device according to claim 3, wherein, the functional component comprises at least one of a sensor, a sensor system, a camera, an air duct, a headlight, or a bumper.

5. The closing device according to claim 1, wherein, the deformation element serves as an energy absorber for the pedestrian protection during an impact of the vehicle.

6. The closing device according to claim 1, wherein, at least two deformation elements are configured at the support element.

7. The closing device according to claim 6, wherein, the deformation elements are assembled on opposing sides of the support element.

8. The closing device according to claim 6, wherein, a third deformation element is intended at the support element.

9. The closing device according to claim 8, wherein, a third deformation element is intended at the support element, centrically in longitudinal direction of the vehicle.

10. The closing device according to claim 1, wherein, the deformation element comprises at least one hollow chamber.

11. The closing device according to claim 1, wherein, the support element is configured for fastening an actuator in order to drive the at least one closing element.

12. The closing device according to claim 1, wherein, the closing element is a roller blind element.

13. The closing device according to claim 1, wherein, the closing element is an air flap.

14. The closing device according to claim 1, wherein, a plurality of closing elements is intended in order to adjust a desired blinding of the functional component.

15. The closing device according to claim 1, wherein, the closing device is configured as a front module adapter.

16. The closing device according to claim 1, wherein, the support element and the deformation element configure a common monolithic component.

17. The closing device according to claim 16, wherein, the support element and the deformation element are configured from one material, preferably configured as an injection moulding component.

18. The closing device according to claim 1, wherein, the fixation aid is configured in form of a guidance.

19. The closing device according to claim 18, wherein, the fixation aid is configured in form of a guidance which interacts with a fixation means, wherein preferably the fixation means is configured in form of the screw.

20. A front end module of a vehicle with a mounting support,
wherein,
the front end module comprises at least one closing devices with at least one deformation element for the absorption of the impact energy at the vehicle,
wherein the closing device is mounted at the mounting support by a deformation element, and
wherein the deformation element comprises a fixation aid and is adapted to mount the closing device on the mounting support of the vehicle through the fixation aid of the deformation element.

21. The front end module according to claim 20, wherein, the front end module is configured with a closing device for closing an essential component of a vehicle with at least one closing element (11) for regulating an air inlet to the essential component and
a support element (12) for the acceptance of the at least one closing element (11) wherein
the closing device (10) comprises at least one deformation element (20) for the absorption of the impact energy at the vehicle.

22. A method for mounting a closing device configured for closing a functional component of a vehicle and with at least one closing element for regulating an air inlet to the functional component and configured with a support element for the acceptance of the at least one closing element, and wherein
the closing device comprises at least one deformation element for the absorption of the impact energy at the vehicle,
comprising the following steps:
1) Assembly of the closing device at the vehicle and
2) Mounting of the closing device at the vehicle by a fixation means with a fixation aid of the closing device.

23. The method according to claim 22, wherein, the method serves at least for mounting a closing device-for closing an essential component of a vehicle with at least one closing element (11) for regulating an air inlet to the essential component and
a support element (12) for the acceptance of the at least one closing element (11), wherein
the closing device (10) comprises at least one deformation element (20) for the absorption of the impact energy at the vehicle or a front end module of a vehicle with a mounting support,
wherein,
the front end module comprises at least one closing devices with at least one deformation element for the absorption of the impact energy at the vehicle.

* * * * *